J. P. BARKER.
UNIVERSAL DRIVING JOINT FOR TRACTORS, &c.
APPLICATION FILED NOV. 28, 1916.
1,254,763.
Patented Jan. 29, 1918.
2 SHEETS—SHEET 2.
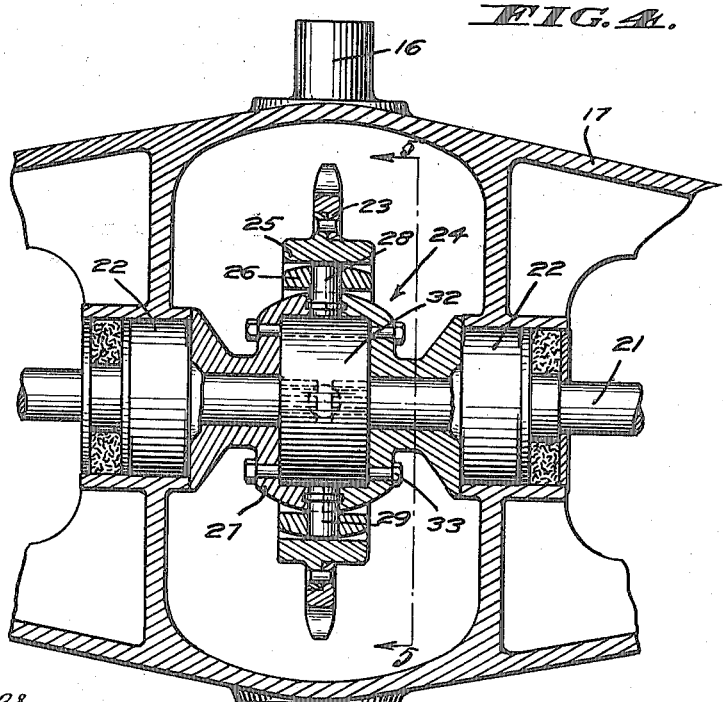
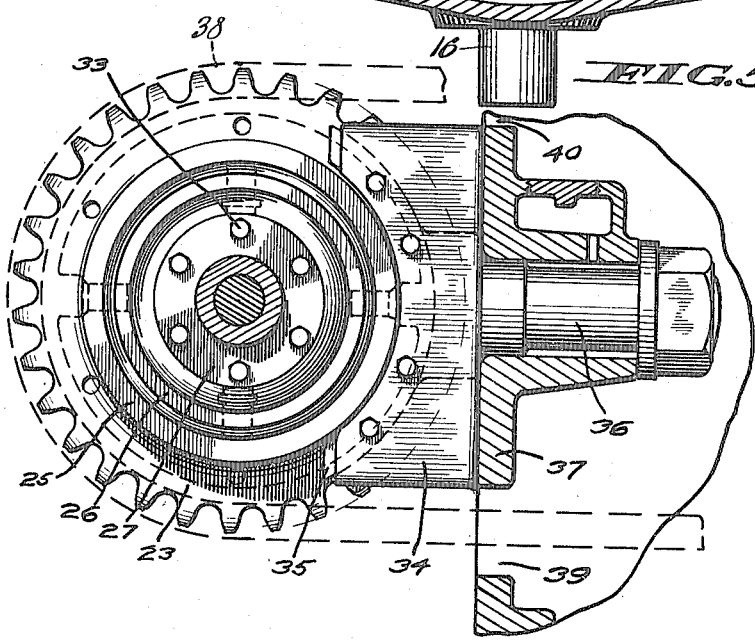
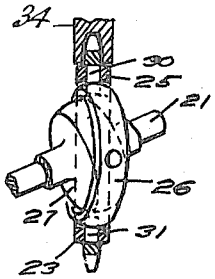
INVENTOR
JOHN P. BARKER:
BY Hazard & Miller
ATTORNEYS

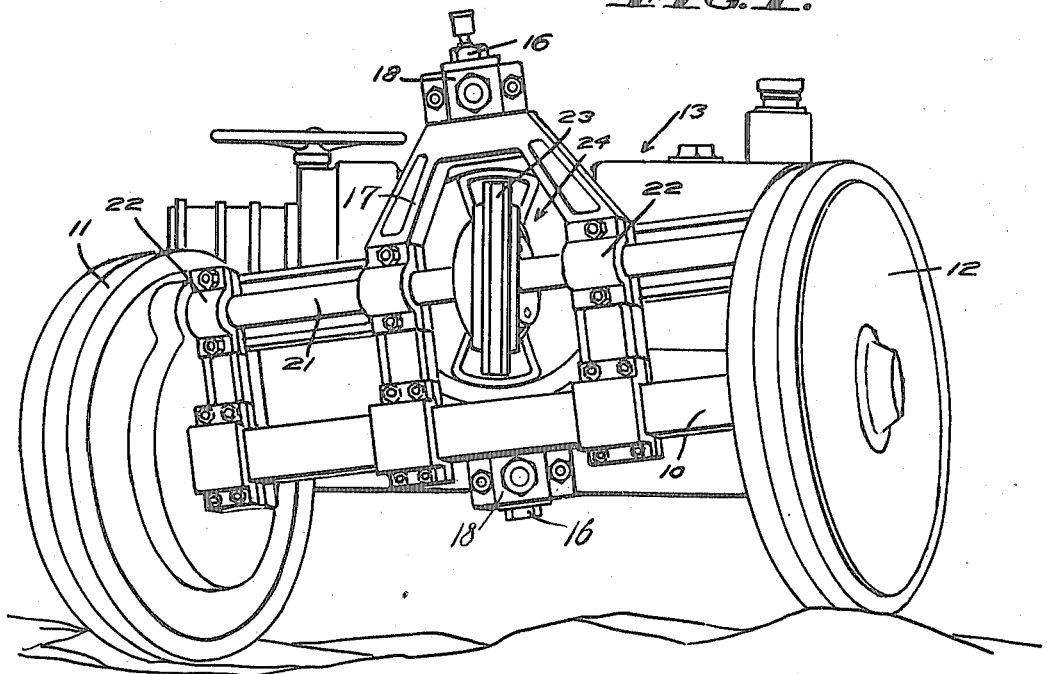
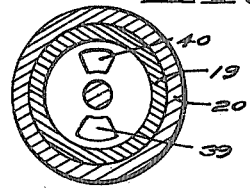
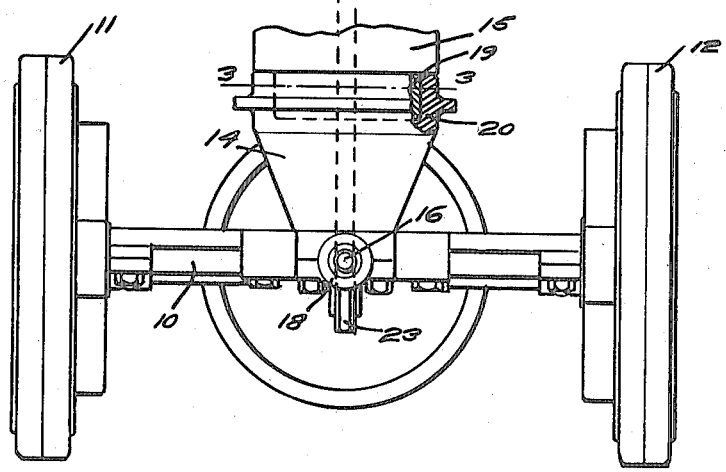

UNITED STATES PATENT OFFICE.

JOHN P. BARKER, OF GLENDALE, CALIFORNIA, ASSIGNOR, BY MESNE ASSIGNMENTS, TO HOMER MOTORS COMPANY, OF LOS ANGELES, CALIFORNIA, A CORPORATION OF ARIZONA.

UNIVERSAL DRIVING-JOINT FOR TRACTORS, &c.

1,254,763.            Specification of Letters Patent.      Patented Jan. 29, 1918.

Application filed November 28, 1916.    Serial No. 133,973.

*To all whom it may concern:*

Be it known that I, JOHN P. BARKER, a citizen of the United States, residing at Glendale, in the county of Los Angeles and State of California, have invented new and useful Improvements in Universal Driving-Joints for Tractors, &c., of which the following is a specification.

This invention relates to a power transmission for vehicles and particularly pertains to a universal driving mechanism for dirigible front axles of motor vehicles.

It is an object of this invention to provide a universal driving mechanism for the front axles of heavy motor vehicles, such as tractors, in which the front wheels are mounted upon a common dirigible axle which is secured in relation to the frame of the vehicle so that the axle will be afforded vertical as well as horizontal swinging movement.

Another object is to provide means whereby a power transmission sprocket may be mounted upon the universally movable front axle jack-shaft and may be maintained in its vertically alined position irrespective of the angular disposition of the front axle and without interruption of the power delivery thereto.

Another object is to provide a pivotal mounting for affording the vehicle axle vertical and horizontal movement without interfering with the delivery of power from its source to the transmission sprocket of the front axle jack-shaft.

Another object is to provide a dirigible front axle for heavy duty motor vehicles which will be decidedly strong in its construction and its parts so designed as to be driven by a powerful power plant without danger of the parts becoming weakened or broken under either normal or excessive loads.

It is a further object to provide a universal power transmission for dirigible axles which possesses few movable parts adapted to be strongly designed and not liable to require special care nor repair.

Other objects will appear hereinafter.

The invention is illustrated, by way of example, in the accompanying drawings in which:

Figure 1 is a view in perspective illustrating the front axle of a tractor showing it as equipped with the universal transmission and particularly disclosing the adaptability of the transmission mechanism to the angular position of the axle, and showing a built up axle and jack-shaft frame.

Fig. 2 is a view in plan illustrating the dirigible front axle and its universal pivotal mounting in connection with the frame of the tractor.

Fig. 3 is a view in transverse section as seen on the line 3—3 of Fig. 2 and as particularly illustrating the vertical pivotal mounting provided the axle.

Fig. 4 is a view in vertical section as seen through the driving sprocket of the front axle and the universal joint provided therefor and further discloses one form of jack-shaft mounting therefor.

Fig. 5 is a view in section and elevation as seen on the line 5—5 of Fig. 4 and as illustrating the stabilizer blocks provided to maintain the transmission sprocket in vertical alinement.

Fig. 6 is a view in perspective drawn on a reduced scale and illustrates the universal action of the transmission gear joint.

Referring to the drawings more particularly, 10 indicates a rigid vehicle axle upon the opposite ends of which traction wheels 11 and 12 are rotatably mounted. As illustrated in the drawings, this axle and its wheels form the front dirigible axle of the tractor 13 and are mounted in a manner to move universally in relation to the body of said tractor. This is accomplished by means of a bracket 14 secured to the frame 15 of the tractor in a manner to permit vertical movement of the bracket in relation to the frame, and vertically extending pivot pins 16 which are mounted upon a jack-shaft and axle housing 17 and rotatably secured within bearings 18 formed integral with the forward end of the axle bracket 14, thus allowing the axle to move horizontally.

The frame 15 is formed with a cylindrical end portion 19 which telescopes within a bore 20 formed in the rear end of the axle bracket 14. The bracket is therefore adapted to swing vertically around the cylindrical end of the frame and thus provides a secure pivotal mounting for the bracket and axle.

The forward ends of the bracket 14 extend upwardly and downwardly and are formed with the bearings 18 within which pivot pins 16 are rotatably mounted. These pins, as particularly shown in Fig. 4 of the drawings, are formed integral with and extend upwardly and downwardly from the top and bottom of the jack-shaft and axle housing 17 and allow the upper end of the bracket 14 to rest upon the housing and in horizontal pivoted relation thereto, thus supporting the forward end of the tractor. The pivot pins 16 serve as the king bolt to allow the front axle to swing horizontally to steer the tractor, and the joint between the parts 19 and 20 serves as the rocker to allow one axle to vibrate relative to the other.

The jack-shaft and axle housing 17 are secured to the axle 10 and with the jack-shaft and axle in vertical and parallel alinement. Rotatably mounted within this housing is a jack-shaft 21 which is suitably held by a series of bearings 22 and provides transmission of power to the driving mechanism of the front wheels. This driving mechanism is incased within the body of each wheel and positively rotates them. The central portion of the jack-shaft and axle housing is open to permit a transmission sprocket 23 to be mounted upon and in driving relation to the jack-shaft. As shown in the drawings, the sprocket 23 is mounted upon a universal joint 24 of a construction which will permit the axle and jack-shaft to assume angular, vertical and horizontal positions without interrupting the rotation of the sprocket or its transmission of power to the shaft. This is accomplished by means of an outer universal joint ring 25 and an inner universal joint ring 26 which are in turn mounted upon a center block 27. The center block is provided with a pair of diametrically disposed pivot pins 28 and 29 which extend outwardly and fit within bores formed through the inner ring 26. This ring is formed with diametrically opposite trunnions 30 and 31 which register with bores formed in opposite sides of the outer ring 25 upon which the sprocket 23 is mounted. The center block 27 is of a shape which resembles the equatorial section of a sphere so that the inner ring 26 may swing horizontally upon its vertically alined pivot pins 28 and 29. The ring 26 is also formed with a spherical face which is concentric with the center of the block 27 so that outer ring 25 and its sprocket may be maintained in a vertical position while the inner ring 26 and the center block 27 swing vertically. Fitted within the center block is a shaft coupling 32 within which the adjacent squared ends of the jack-shaft 21 are fitted and driven, due to the fact that the coupling 32 is secured by bolts 33 to the center block and adapted to rotate therewith. The oppositely extending portions of the jack-shaft are mounted within bearings 22 between which the center block 27 is positioned to rotate and held against horizontal movement.

As a means for maintaining the sprocket 23 and the outer ring 25, upon which it is mounted, in vertical alinement, a stabilizer block 34 is grooved to straddle the sprocket teeth and positioned to engage upon opposite sides of the sprocket and in frictional engagement with the periphery of the ring 25. This block is formed with arcuate faces which conform to the periphery of the ring and are further provided with wear plates 35 which bear against the sides of the sprocket to assist in alining it. The stabilizer block is formed with a stud 36 by which it is secured to an end plate 37 formed within the forward end of cylinder 19 with which the frame 15 is provided.

The sprocket 23 is driven by means of a sprocket chain 38 which passes around the sprocket and through openings 39 and 40 formed through the end plate 37. These openings are vertically alined and permit the chain to pass to a driving sprocket mounted upon the vehicle frame and driven from a suitable source of power.

In operation, the device is assembled, as indicated in the drawings, with jack-shaft 21 superimposed above the axle 10 and adapted to be driven by sprocket 23 mounted upon its universal joint mounting 24. When the sprocket 23 is rotated by chain 38, the jack-shaft 21 will be rotated to drive the wheels 11 and 12 rotatably mounted upon the axle. In case the highway is irregular and the front and rear axles of the vehicle are thrown out of horizontal alinement, the axle 10 will swing by means of bracket 14 around the cylinder 19 formed on the frame and adjust itself to the irregularities in the level of the road-bed. When the axle moves in this manner the center block 27 of the universal joint will swing so that its pins 28 and 29 will move out of vertical alinement and in so doing will swing the inner ring 26 in a like direction. This ring will move upon its trunnions and allow the ring 25 and sprocket 23 to maintain their vertically alined positions as determined by the stabilizer blocks. This will permit the axle and jack-shaft mounted thereupon to move vertically without interfering with the power transmission.

The axle disclosed in the drawings is provided with a suitable steering mechanism by which it may move horizontally upon its pivot pin 16 and in relation to the bracket 14. This movement will again cause the jack-shaft to swing and in so doing the center block 27 and its pins 28 and 29 will rotate in relation to the inner ring 26, thereby allowing freedom of movement without interfering with the delivery of power to the jack-shaft.

It will thus be seen that the power transmission here provided for a dirigible vehicle axle will act in a positive manner to deliver power to the axle wheels irrespective of their vertical or horizontal angular positions and further provides that the power will be delivered through a rigid mechanism which is not susceptible to undue strains and which is simple in its construction.

While I have shown the preferred construction of my universal driving mechanism for the front axles of heavy motor vehicles as now known to me, it will be understood that various changes in the construction, combination and arrangement of parts may be made by those skilled in the art, without departing from the spirit of my invention, as defined in the appended claims.

I claim:

1. A dirigible power driven vehicle axle, comprising a non-rotatable axle member, traction wheels rotatably mounted upon the ends of said member, a jack-shaft housing superimposed upon said axle member, a jack-shaft rotatably mounted within said housing and adapted to drive the traction wheels, a vertically extending pivot pin mounted upon said jack-shaft housing mid-way its length and adapted to be engaged by a frame bracket thereby providing the axle member with horizontal movement, means whereby said frame bracket may be secured to a vehicle frame in a manner to provide the axle member with vertical swinging movement, a universal driving member secured to said jack-shaft and disposed upon the line of coincidence of the vertical and horizontal axes of the axle member, a driving sprocket mounted upon said universal driving member and adapted to impart movement of rotation thereto, and means whereby the driving sprocket will be maintained in a vertically alined position irrespective of the angular disposition of the jack-shaft in relation thereto.

2. In a power transmission for the steering wheels of a vehicle, a jack-shaft and axle housing, an axle rigidly mounted in the housing, traction wheels rotatably mounted upon the ends of the axle, a jack-shaft rotatably mounted in the housing parallel with the axle, means connecting the ends of the jack-shaft to the traction wheels for driving the traction wheels, pivot pins extending upwardly and downwardly from the housing, a frame bracket in which the pivot pins operate, a frame secured to the frame bracket; the bracket being adapted to rotate relative to the frame, thereby providing the housing with horizontal movement upon the pivot pins and with vertical swinging movement upon the connection between the bracket and the frame; a universal driving member secured to the jack-shaft and disposed upon the line of coincidence of the vertical and horizontal axes of the axle, a driving sprocket mounted upon said universal driving member and adapted to impart movement of rotation thereto, and means whereby the driving sprocket will be maintained in a vertically alined position irrespective of the angular disposition of the jack-shaft in relation thereto.

3. In a power transmission for the steering wheels of a motor vehicle, a jack-shaft and axle housing, an axle mounted in the housing, wheels upon the ends of the axle, a jack-shaft mounted in the housing, connections between the jack-shaft and the wheels for driving the wheels, a frame bracket embracing the housing and pivotally connected thereto, a main frame to which the frame bracket is rotatably connected upon a longitudinal axis; so that the housing may swing horizontally to steer the vehicle and may vibrate vertically due to the unevenness of the road; and a universal driving gear for the jack-shaft.

4. In a power transmission for the steering wheels of a motor vehicle, a jack-shaft and axle housing, a jack-shaft rotatably mounted in the housing, a transmission sprocket, an outer universal joint ring fixed within the sprocket, an inner universal joint ring within the outer ring, a center block within the inner universal joint ring and fixed upon the jack-shaft, diametrically opposed pivot pins connecting the center block to the inner ring, diametrically opposed pivot pins connecting the inner ring to the outer ring and arranged at right angles to the first pins, and a stabilizer block having a groove to receive the sprocket teeth and engaging the sides of the sprocket, said stabilizer block having a stud rigidly mounted.

In testimony whereof I have signed my name to this specification.

JOHN P. BARKER.